(12) United States Patent
Zhang (10) Patent No.: US 12,237,970 B2
(45) Date of Patent: Feb. 25, 2025

(54) METHOD AND APPARATUS FOR MONITORING APPLICATION SERVICE, ELECTRONIC DEVICE, AND READABLE STORAGE MEDIUM

(71) Applicant: INSPUR SUZHOU INTELLIGENT TECHNOLOGY CO., LTD., Jiangsu (CN)

(72) Inventor: Lianfa Zhang, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/254,925

(22) PCT Filed: Nov. 30, 2021

(86) PCT No.: PCT/CN2021/134436
§ 371 (c)(1),
(2) Date: May 30, 2023

(87) PCT Pub. No.: WO2023/024307
PCT Pub. Date: Mar. 2, 2023

(65) Prior Publication Data
US 2024/0007346 A1    Jan. 4, 2024

(30) Foreign Application Priority Data
Aug. 27, 2021 (CN) .......................... 202110991847.0

(51) Int. Cl.
*H04L 41/069* (2022.01)
*H04L 41/046* (2022.01)
(Continued)

(52) U.S. Cl.
CPC .......... *H04L 41/069* (2013.01); *H04L 41/046* (2013.01); *H04L 41/0681* (2013.01); *H04L 41/0806* (2013.01); *H04L 43/04* (2013.01)

(58) Field of Classification Search
CPC ... H04L 67/10; H04L 43/0817; H04L 41/046; H04L 43/16; H04L 41/40; H04L 67/02;
(Continued)

(56) References Cited

U.S. PATENT DOCUMENTS 9,313,281 B1 *  4/2016  Lietz ....................... H04L 67/51
10,296,365 B1 *  5/2019  Devillard ............. G06F 11/3452
(Continued)

FOREIGN PATENT DOCUMENTS

CN    104657250 A     5/2015
CN    106533838 A     3/2017
(Continued)

OTHER PUBLICATIONS

Search report for PCT/CN2021/134436 mailed on May 16, 2022.
(Continued)

*Primary Examiner* — Djenane M Bayard
(74) *Attorney, Agent, or Firm* — Dennemeyer & Associates LLC (57) ABSTRACT

The present disclosure discloses a method and apparatus for monitoring application service, an electronic device, and a non-transitory readable storage medium. The method includes: installing, in a cloud host of a cloud platform, a communication apparatus which interacts with a host machine without depending on a network, and deploying data collection agents in the host machine; simultaneously, integrating data collection programs matched with the data collection agents, and matched with data collection templates of various types of application services in an application service installation package; when it is detected that
(Continued)

a target application service is generated, generating a data collection configuration file according to attribute information of the target application service and a target data collection template matched with the type of the target application service; and when the target application service is successfully deployed in the cloud host, acquiring monitoring performance data which is collected by the cloud host.

17 Claims, 2 Drawing Sheets

(51) Int. Cl.
*H04L 41/0681* (2022.01)
*H04L 41/0806* (2022.01)
*H04L 43/04* (2022.01)

(58) Field of Classification Search
CPC . H04L 43/0876; H04L 63/1416; H04L 63/20; H04L 67/1097; H04L 41/0897; H04L 43/028; H04L 43/20; H04L 47/83; H04L 67/535; H04L 41/0806; H04L 41/0895; H04L 41/0896; H04L 41/142; H04L 41/22; H04L 43/04; H04L 43/0852; H04L 63/10; H04L 63/1433; H04L 67/125; H04L 67/34; H04L 41/0843; H04L 41/14; H04L 43/08; H04L 47/827; H04L 67/025; H04L 41/145; H04L 41/5009; H04L 43/106; H04L 43/12; H04L 67/1029; H04L 67/1031; H04L 67/52; H04L 67/566; H04L 67/75; H04L 9/0866; H04L 12/6418; H04L 41/065; H04L 41/0681; H04L 41/069; H04L 41/0803; H04L 41/0816; H04L 41/0893; H04L 41/16; H04L 41/5012; H04L 41/5019; H04L 41/5058; H04L 43/024; H04L 43/045; H04L 43/0805; H04L 43/10; H04L 9/50; H04L 2209/56; H04L 67/12; H04L 9/3239; H04L 1/0041; H04L 1/0002; H04L 1/18; H04L 5/0064; H04L 67/60; H04L 45/24; H04L 63/00; H04L 67/306; H04L 1/0009; H04L 63/1441; H04L 67/562; H04L 1/1874; H04L 1/0076; H04L 1/16; H04L 1/1854; H04L 1/1867; H04L 27/0014; H04L 41/0631; H04L 41/12; H04L 5/0008; H04L 43/06; H04L 63/1425; H04L 67/141; H04L 69/08; H04L 9/3236; H04L 1/004; H04L 1/187; H04L 2209/805; H04L 41/0894; H04L 41/147; H04L 41/149; H04L 41/5025; H04L 41/5051; H04L 43/0823; H04L 67/04; H04L 67/1008

See application file for complete search history.

(56) References Cited

U.S. PATENT DOCUMENTS

| | | | |
|---|---|---|---|
| 2006/0020942 A1* | 1/2006 | Ly | G06F 9/5027 718/100 |
| 2009/0292799 A1 | 11/2009 | Eisener et al. | |
| 2009/0315972 A1 | 12/2009 | Rensin et al. | |
| 2010/0106678 A1* | 4/2010 | Pietrek | H04L 41/046 707/E17.014 |
| 2012/0167094 A1* | 6/2012 | Suit | G06F 9/5077 718/100 |
| 2016/0366233 A1* | 12/2016 | Le | H04L 67/51 |

FOREIGN PATENT DOCUMENTS

| | | |
|---|---|---|
| CN | 108449438 A | 8/2018 |
| CN | 108512719 A | 9/2018 |
| CN | 109274557 A | 1/2019 |
| CN | 110175451 A | 8/2019 |
| CN | 110247801 A | 9/2019 |
| CN | 112073252 A | 12/2020 |
| CN | 112383502 A | 2/2021 |
| CN | 113132349 A | 7/2021 |
| CN | 113438136 A | 9/2021 |
| EP | 3366756 A1 | 8/2018 |

OTHER PUBLICATIONS

Search report for Chinese application 202110991847.0 filed on Aug. 27, 2021.

Zhuo, Shuai, OpenStack "(Research on Key Technologies of Energy Saving Based on Open Stack Cloud Platform)", (Chinese Master's Theses Full-Text Database), Jun. 30, 2019 (Jun. 30, 2019), chapters 4 and 5.

Xu, Chenglin, "(Design and Implementation of Server Virtualization Management System)", (Chinese Master's Theses Full-Text Database), Oct. 31, 2017 (Oct. 31, 2017), Chapter 4.

* cited by examiner

METHOD AND APPARATUS FOR MONITORING APPLICATION SERVICE, ELECTRONIC DEVICE, AND READABLE STORAGE MEDIUM

CROSS-REFERENCE TO RELATED APPLICATIONS

This is a 35 U.S.C. 371 National Stage Patent Application of International Application No. PCT/CN2021/134436, filed Nov. 30, 2021, which claims priority to Chinese application 202110991847.0, filed Aug. 27, 2021, each of which is hereby incorporated by reference in its entirety.

TECHNICAL FIELD

The embodiments of the present disclosure relate to the field of cloud computing, in particular to a method and apparatus for monitoring application service, an electronic device, and a non-transitory readable storage medium.

BACKGROUND

With the continuous improvement of the application scale of a cloud platform, the monitoring and alerting of platform resources such as a host, a cloud host and a bare machine, core services such as a RabbitMQ cluster, MySQL and a storage cluster, and self-developed components in the cloud platform has been realized. With the increase of the scale of the cloud platform, user-side services running inside the cloud host, namely application services such as the MySQL, the RabbitMQ cluster and Tomcat, may inevitably increase, and the monitoring and alerting of the application services is becoming more and more urgent.

It is understandable that the application services are in a service network, and a monitoring and alerting system of the cloud platform is in a management network, and the two networks are directly disconnected. In response to that the network is connected to use the monitoring and alerting system to monitor and alert the application services, the network complexity may be undoubtedly increased, and there are also security risks. In addition, due to the variety of the application services, related technologies do not achieve unified data collection, resulting in the need for a lot of development to add one service. Moreover, the cloud platform may not be automatically identified and correctly collect monitoring data after creating the application service, that is, the cloud platform does not support the automatic addition of an application service instance.

In view of this, how to securely and efficiently monitor various types of application services on the cloud platform is a technical problem that needs to be solved by those skilled in the art.

SUMMARY

In one aspect, the embodiments of the present disclosure provide a method for monitoring application service, which includes the following operations:
a communication apparatus which interacts with a host machine without depending on a network is installed in a cloud host of a cloud platform in advance, and data collection agents are deployed in the host machine;
data collection programs matched with the data collection agents, and data collection templates of various types of application services are integrated in an application service installation package in advance;
when it is detected that a target application service is generated, a data collection configuration file is generated according to attribute information of the target application service and a target data collection template that matched with the type of the target application service;
when the target application service is deployed in the cloud host, monitoring performance data which is collected by the cloud host on the basis of the data collection configuration file is acquired.

In some embodiments of the present disclosure, after it is detected that the target application service is generated, the method further includes the following operations:
a target alert template matched with the type of the target application service is acquired;
an alert instance is automatically generated for the target application service according to the target alert template;
In response to a threshold setting instruction, a corresponding alert threshold is set for each performance item of the alert instance.

In some embodiments of the present disclosure, after the alert instance is automatically generated for the target application service according to the target alert template, the method further includes the following operations:
it is determined that whether a target alert task of the type to which the alert instance belongs exists;
in response to that the target alert task of the type to which the alert instance belongs exists, the alert instance is added to the target alert task;
in response to that the target alert task of the type to which the alert instance belongs does not exist, the target alert task of the type to which the alert instance belongs is automatically created, and simultaneously the alert instance is added to the target alert task.

In some embodiments of the present disclosure, after the alert instance is automatically generated for the target application service according to the target alert template, the method further includes the following operations:
a corresponding periodic task is automatically generated for each type of the alert task according to a preset frequency;
when it is detected that a target periodic task is generated, current performance data values of all application services to be alerted of the alert task corresponding to the target periodic task are acquired;
the alert threshold of each performance item is acquired from the alert instance of each application service to be alerted;
for each application service to be alerted, alert information is generated according to the current performance data value of the current application service to be alerted and the corresponding alert threshold.

In some embodiments of the present disclosure, after the data collection programs matched with the data collection agents, and the data collection templates of various types of application services are integrated in the application service installation package in advance, the method further includes the following operation:
based on an average number of the alert tasks and an average weight of the alert tasks, all the current alert tasks are automatically evenly allocated to multiple alert task instances for execution.

In some embodiments of the present disclosure, after the target application service is deployed in the cloud host, the method further includes the following operations:

a data query template is configured for each type of the application service in advance, and a query identity is set;

in response to a data query instruction, a target data query template matched with the type of the target application service is acquired;

According to the query identity of the target application service, data query information of the target application service is generated on the basis of the target data query template.

In another aspect, the embodiments of the present disclosure provide an apparatus for monitoring application service, which includes a deployment component, a data collection configuration component, and a data collection component.

The deployment component is configured to install, in a cloud host of a cloud platform in advance, a communication apparatus which interacts with a host machine without depending on a network, and deploy data collection agents in the host machine; and integrate data collection programs matched with the data collection agents, and matched with data collection templates of various types of application services in an application service installation package.

The data collection configuration component is configured to generate, when it is detected that a target application service is generated, a data collection configuration file according to attribute information of the target application service and a target data collection template matched with the type of the target application service.

The data collection component is configured to acquire, when the target application service is deployed in the cloud host, monitoring performance data which is collected by the cloud host on the basis of the data collection configuration file.

In some embodiments of the present disclosure, the apparatus further includes an alert configuration component, configured to acquire a target alert template matched with the type of the target application service; automatically generate an alert instance for the target application service according to the target alert template; and set, in response to a threshold setting instruction, a corresponding alert threshold for each performance item of the alert instance.

The embodiments of the present disclosure also provide an electronic device, which includes a processor. The processor is configured to execute a computer program stored in a memory to implement any one of the steps of the method for monitoring application service as described above.

Finally, the embodiments of the present disclosure also provide a non-transitory readable storage medium. A computer program is stored on the non-transitory readable storage medium, and when executed by a processor, the computer program implements any one of the steps of the method for monitoring application service as described above.

In addition, the embodiments of the present disclosure also provide a corresponding implementation apparatus, electronic device and non-transitory readable storage medium for the method for monitoring application service, which further makes the method more practical, and the apparatus, electronic device and non-transitory readable storage medium have corresponding advantages.

It is to be understood that the above general description and the following detailed description are only exemplary and not intended to limit the embodiments of the present disclosure.

BRIEF DESCRIPTION OF THE DRAWINGS

In order to more clearly illustrate the embodiments of the present disclosure or the technical solutions in the related art, the drawings used in the description of the embodiments or the related art will be briefly described below. It is apparent that the drawings described below are only some embodiments of the present disclosure. Other drawings may further be obtained by those of ordinary skill in the art according to these drawings without creative efforts.

DETAILED DESCRIPTION OF THE EMBODIMENTS

In order to make the solutions of the present disclosure understood by those skilled in the art, the embodiments of the present disclosure will be described below in detail in combination with the drawings and the implementation modes. It is apparent that the described embodiments are only a part of the embodiments of the present disclosure, and not all of them. All other embodiments obtained by those of ordinary skill in the art based on the embodiments of the present disclosure without creative efforts are within the scope of protection of the embodiments of the present disclosure.

Terms "first", "second", "third", "fourth" and the like in the specification and claims of the present disclosure and the above accompanying drawings are used to distinguish similar objects, and are not necessarily used to describe a specific order or sequence. In addition, terms "include" and "have" and any variations thereof are intended to cover non-exclusive inclusions. For example, it is not limited for processes, methods, systems, products or devices containing a series of steps or units to clearly list those steps or units, and other steps or units which are not clearly listed may be included instead.

After describing the technical solutions of the embodiments of the present disclosure, various non-restrictive implementation modes of the embodiments of the present disclosure are described in detail below.

Figure 1:
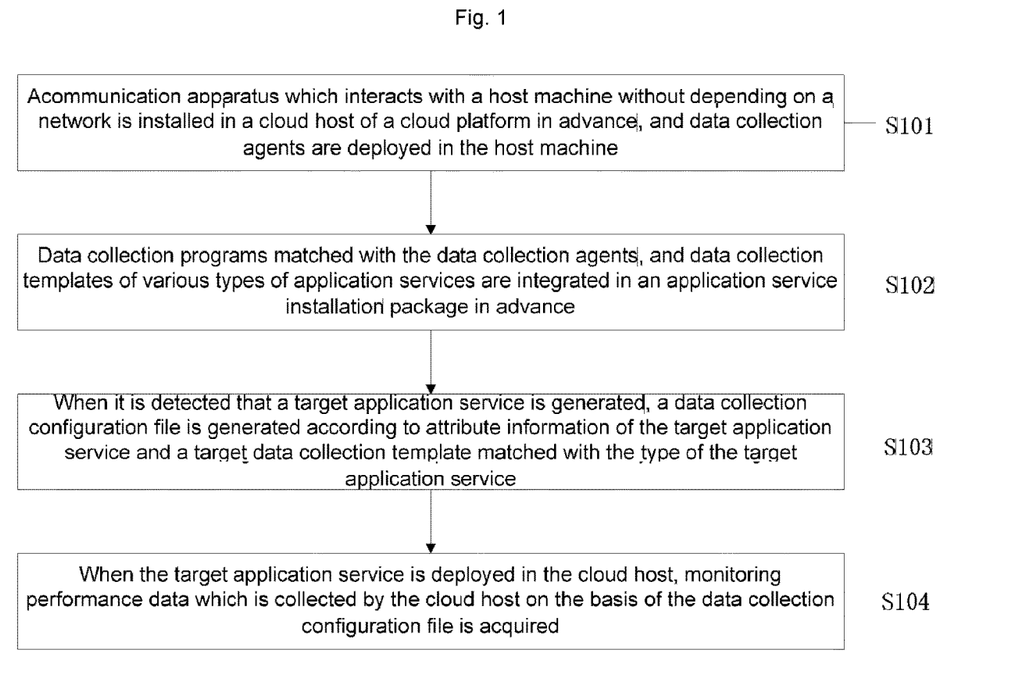
FIG. 1 is a flowchart of a method for monitoring application service according to the embodiments of the present disclosure.

Firstly, referring to FIG. 1, FIG. 1 is a flowchart of a method for monitoring application service according to the embodiments of the present disclosure. The embodiments of the present disclosure may include the following contents.

At S101, a communication apparatus which interacts with a host machine without depending on a network is installed in a cloud host of a cloud platform in advance, and data collection agents are deployed in the host machine.

In some embodiments of the present disclosure, the host machine and the cloud host are equipped on the cloud platform, an executive subject of the embodiments of the present disclosure is a monitoring and management system, the monitoring and management system is deployed in the host machine, and a network where the monitoring and management system is located belongs to a management network. An application service is deployed in the cloud host of the cloud platform, and a network where the application service is located is an application network. The monitoring and management system of the cloud platform needs to acquire performance data of the cloud host to monitor and manage the application service of the cloud host, and the management network and the application network are disconnected. In order to not increase the network complexity, the management network and the application network may not be connected. In the embodiments of the present disclosure, the data communication between the cloud host and the host machine needs to depend on the communication apparatus that does not depend on the network, that is, the communication apparatus which interacts with the host machine without depending on the network needs to be installed in the cloud host. As an implementation mode of the embodiments of the present disclosure, a Qemu Guest Agent (QGA) is an ordinary application program running inside a virtual machine, with an executable file name defaulting to qemu-ga, and a service name defaulting to qemu-guest-agent for implementing a way of achieving interaction between the host machine and the virtual machine. This method does not depend on the network, but depends on virtio-serial(a default preferred method) or isa-serial, and the QEMU provides a simulation and data exchange channel of a serial device, the final display is a serial device (inside of the virtual machine) and a unix socket file (on the host machine). Accordingly, the QGA may be installed inside the cloud host, and the monitoring and management system of the host machine may collect data through the QGA.

After the data communication between the host machine and the cloud host without depending on the network is realized, a data collection apparatus needs to be deployed. In some embodiments of the present disclosure, telegraf is an agent for collecting and reporting indicators and data, with built-in rich data collection plug-ins or self-developed data collection scripts, so that telegraf may be used as the data collection agent in the embodiments of the present disclosure. Accordingly, a matched data collection program, namely a telegraf program, needs to be installed inside the cloud host within the monitoring scope. The monitoring and management system deploys the memory-resident data collection agent telegraf in each host machine, which may periodically call the telegraf program inside the cloud host through the QGA and capture the data output, and then report to a time series database influxdb. After the application service is successfully deployed, the telegraf on the host machine may execute telegraf—config telegraf_mysql-.conf—test inside the cloud host where the application is located through the QGA to acquire monitoring performance data.

At S102, data collection programs matched with the data collection agents, and data collection templates of various types of application services are integrated in an application service installation package in advance.

The embodiments of the present disclosure adopt a same data collection mode for the same type of the application services, and different data collection modes for different types of the application services. For ease of implementation, a template may be made for the data collection configuration file of each application service, such as a mysql collection template and a RabbitMQ cluster template. In response to that the data collection agent is Telegraf, the Telegraf data collection program and various data collection templates may be integrated into the application service installation package.

The data collection template may be created according to basic parameters such as a name, an Identity (ID), a server, and running time of the application, and MySQL and RabbitMQ clusters are taken as examples to define the data collection template below. Herein, the MySQL data collection template may be represented as:

[[global_tags]]
   appid=APPID
appname=APPNAME
[[inputs.mysql]]
interval=INTERVAL
timeout="60 s"
servers=["USER: PASSWORD@tcp(HOST: PORT)/?tls=false"]

The data collection template of the RabbitMQ cluster may be represented as:

[[global_tags]]
   appid=APPID
appname=APPNAME
[[inputs. rabbitmq]]
interval=INTERVAL
timeout="60 s"
url="http://HOST:PORT At S103, when it is detected that a target application service is generated, a data collection configuration file is generated according to attribute information of the target application service and a target data collection template matched with the type of the target application service.

Each time an application service instance is created, a specific variable of the data collection template is replaced according to the basic information or the attribute information of the instance, that is, the corresponding data collection template is initialized to generate the actual data collection configuration file. The attribute information is an application ID, an application instance name MySQL, a user name, a password, etc. Taking the target application service MySQL as an example, the data collection configuration file of MySQL generated based on this step may be represented as:

[[global_tags]]
   appid="1111111111111111"#32 bit uuid
appname="XX department information MySQL database"
[[inputs.mysql]]
interval="60 s"
timeout="60 s"
servers=["root:xxh123456©tcp(100.2.100.10:3306)/?tls=false"]

At S104, when the target application service is deployed in the cloud host, monitoring performance data which is collected by the cloud host on the basis of the data collection configuration file is acquired.

When it is detected that the target application service is successfully deployed in the cloud host, the monitoring and management system of the host machine of the cloud platform uses the data collection agent to call the corresponding data collection program of the data collection agent inside the cloud host through the communication apparatus of S101 to capture the performance data during a running process as the monitoring performance data. For ease of subsequent data processing, the collected monitoring performance data may be uploaded to the time series database.

In the technical solutions provided by the embodiments of the present disclosure, the data interaction between the host machine and the cloud host of the cloud platform is achieved without the network, and there is no need to connect the network between the service network and the management network, so that the network complexity may not be increased, and the application service may be monitored securely. Through the configuration of the data collection template, the cloud platform may support unified data collection, which may support the access of a variety of application services, and enrich the types of resources supported by a cloud platform monitoring system. A monitoring and management system is convenient and simple to extract the performance data of each application of the cloud host, and may efficiently monitor the application services, which is conductive to improving the stability of the cloud platform and the user experience.

It is to be noted that there is no strict execution sequence of the steps in the embodiments of the present disclosure. As long as the logical order is followed, these steps may be executed simultaneously or in a certain preset sequence. FIG. 1 is only a schematic way, and does not represent the only execution sequence.

In order to further improve the practicability and flexibility of the technical solutions of the embodiments of the present disclosure and enhance the user experience, based on the above embodiment, after acquiring the monitoring performance data of each application deployed in the cloud host, the embodiments of the present disclosure may also perform alert processing based on the monitoring performance data, which may include the following contents.

A target alert template matched with the type of the target application service is acquired; an alert instance for the target application service is automatically generated according to the target alert template; and in response to a threshold setting instruction, a corresponding alert threshold is set for each performance item of the alert instance.

In some embodiments of the present disclosure, for ease of management, a variety of applications are supported to access the cloud platform, and all the alert information of each type of the application service may be unified into the alert template, including an alert ID, a resource type ID, an application ID, a performance data table name, a query field, a filtering field, a grouping field, an alert threshold, etc., as shown in Table 1. One alert task is created for each type of an alert, and the alert information is generated by querying the performance data and comparing same with the threshold. Each time the application service instance is added, all the alert templates under this resource may generate one alert instance. The alert instance may be as shown in Table 2. After the alert instance is generated, a user may customize the alert threshold. The performance item refers to a performance indicator of the application that needs to be monitored, such as temperature.

TABLE 1

Alert template example

| Field type | Example 1 | Example 2 |
|---|---|---|
| Alert ID | alert_app_mysql_connections | alert_app_rabbitmq_queue_messase_rate |
| Resource type | MySQL | RabbitMQ |
| Alert name | MySQL connections alert | RabbitMQ queue message rate alert |
| Table name | mysql | rabbitmq_queues |
| Data field | connections | no_negetive_derivative(messages) |
| Filtering field | null | queue_name!="test" |
| Grouping field | null | queue_name |
| Moderate threshold | 2048 | 8000 |
| Severity threshold | 4096 | 10000 |

TABLE 2

Instantiated alert template

| Field type | Example 1 | Example 2 |
|---|---|---|
| Alert ID | alert_app_mysql_connections | alert_app_rabbitmq_queue_messase_rate |
| Resource instance ID | app_mysql_1111111111111111 | app_rabbitmq_222222 |
| Alert name | MySQL connections alert | RabbitMQ queue message rate alert |
| Table name | mysql | rabbitmq_queues |
| Data field | connections | no_negetive_derivative(messages) |
| Filtering field | null | queue_name!="test" |
| Grouping field | null | queue_name |
| Moderate threshold | 2048 | 8000 |
| Severity threshold | 4096 | 10000 |

Since the system may create the alert task for each type of the alert, after creating the alert instance of the current application, it is determined that whether a target alert task of the type to which the alert instance belongs exists. In response to that the target alert task of the type to which the alert instance belongs exists, the alert instance is added to the target alert task. In response to that the target alert task of the type to which the alert instance belongs does not exist, the target alert task of the type to which the alert instance belongs is automatically created, and simultaneously the alert instance is added to the target alarm task.

As embodiments of the present disclosure, a flow of executing the alert task by the system may be as follows.

A corresponding periodic task is automatically generated for each type of the alert task according to a preset frequency. When it is detected that a target periodic task is generated, current performance data values of all application services to be alerted of the alert task corresponding to the target periodic task are acquired. The alert threshold of each performance item is acquired from the alert instance of each application service to be alerted. For each application ser vice to be alerted, alert information is generated according to the current performance data value of the current application service to be alerted and the corresponding alert threshold.

In some embodiments of the present disclosure, each type of the alert task may automatically generate the periodic task, and each execution may query the current performance data values of all the service instances from the database, query the alert threshold of this alert instance of all service instances from the alert instance, and then perform comparison to generate the alert information. The alert information includes whether to alert, an alert way, such as a buzzer alert or alert text information output, an alert level, etc., which may be flexibly determined by those skilled in the art according to the actual needs. No limitation is made thereto in the embodiments of the present disclosure.

In order to improve the efficiency and effectiveness of the alert, the embodiments of the present disclosure also support load balancing of the alert tasks. An alert scheduling component supports multiple instances, and all the alert tasks are evenly allocated among multiple instances. An allocation strategy supports an average number of the tasks and an average weight of the tasks. Based on the average number of the alert tasks and the average weight of the alert tasks, all the current alert tasks are automatically evenly allocated to multiple alert task instances for execution.

In some embodiments of the present disclosure, the automatic re-balancing of the alert tasks may be realized through the load balancing of the alert tasks. When there is an abnormal instance or a new instance, a new balance state may be reached quickly.

Inevitably, the user needs to query the performance data of each application from the cloud platform. Based on this, the embodiments of the present disclosure also support data query on the basis of the above embodiment, which may include the following operations.

A data query template is configured for each type of the application service in advance, and a query identity is set. In response to a data query instruction, a target data query template matched with the type of the target application service is acquired. According to the query identity of the target application service, data query information of the target application service is generated on the basis of the target data query template.

In some embodiments of the present disclosure, the basic information that may be displayed and queried in all the performance data types of each type of the application service may be unified as the data query template, for example, it may include a data ID, a data name, a table name, a query field, a filtering field, a grouping field, etc., as shown in Table 3. The query identity is index information of the data query template, for example, the performance data may be queried according to the data ID of the application. After data query interfaces are unified, and interface parameters include a data ID, an application ID(appid), and starting and ending time, historical data may be queried. When adding all supported query data, it is only necessary to generate a query data instance according to the query data template.

TABLE 3

Query data template example

| Field type | Example 1 | Example 2 |
|---|---|---|
| Data ID | app_mysql_connections | app_rabbitmq_queue_message_rate |
| Data name | MySQL connections | RabbitMQ queue message rate |
| Table name | mysql | rabbitmq_queues |
| Query field | connections | no_negetive_derivative(messages) |
| Filtering field | null | queue_name!="test" |
| Grouping field | null | queue_name | in order to make the technical solutions of the embodiments of the present disclosure more clearly understood by those skilled in the art, the embodiments of the present disclosure also provide a schematic example, which may include the following contents.

At A1, the data collection template is applied. The data collection agent telegraf and the data collection template of the corresponding application service are integrated in the application installation package.

At A2, the data collection instance is initialized. (1) When creating the application service, an application service ID, a name, a user name, a password and other information thereof are used to initialize the data collection template to generate the data collection instance, namely, telegraf configuration file. (2) The data collection agent telegraf and the data collection instance are integrated into the cloud host where the application service is located. (3) The QGA service is configured in the cloud host.

At A3, the data collection agent of the monitoring and management system is deployed. The data collection agent telegraf is deployed in each host machine, and the data collection agent telegraf inside the cloud host is called through the QGA.

At A4, the storage cluster of the time series database of the monitoring and management system is deployed. After Telegraf collects the data, the data is reported to the storage cluster of the time series database.

At A5, the alert template is applied.

At A6, an alert task scheduling cluster of the monitoring system is deployed. The cluster may start the alert task for any alert type. All the alert tasks are automatically evenly allocated to multiple alert task instances for execution.

At A7, the alert instance is initialized and applied. When a new application service is created and the data is collected normally, the alert task may identify and initialize the alert instance.

At A8, the data query template is initialized. All the monitoring data indicators that need to be queried in the interfaces of all the application services are initialized, and the front end or the third party may query a historical curve graph of the monitoring data indicators according to the data ID.

It may be seen from the above that in the embodiments of the present disclosure, the monitoring and management system of the cloud platform may monitor and alert the application service, support unified data collection, data display and alert template, efficiently support the access of a variety of application services, and support the load balancing of the alert tasks.

The embodiments of the present disclosure also provide a corresponding apparatus for the method for monitoring application service, which further makes the method more practical. The apparatus may be illustrated from the perspective of a functional component and hardware respectively. An apparatus for monitoring application service provided by the embodiments of the present disclosure is described below, and the apparatus for monitoring application service described below and the method for monitoring application service described above may be referred to each other.

Figure 2:
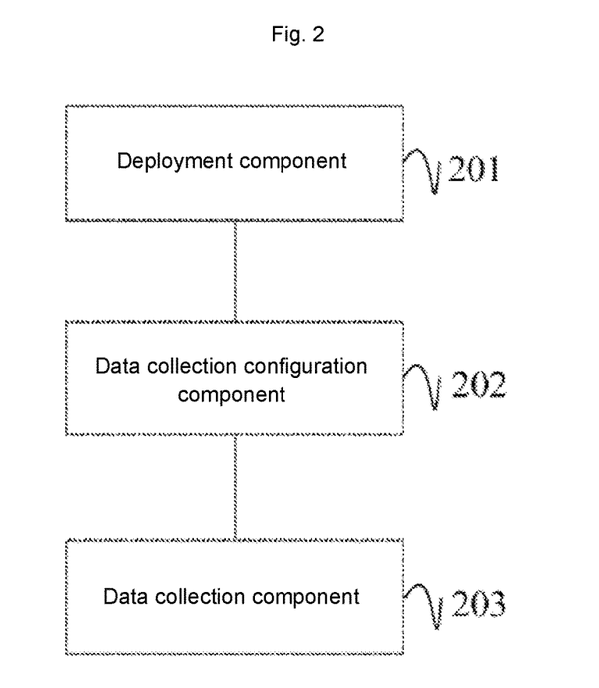
FIG. 2 is a structural diagram of an apparatus for monitoring application service in an implementation mode according to the embodiments of the present disclosure.

From the perspective of the functional component, referring to FIG. 2, FIG. 2 is a structural diagram of an apparatus for monitoring application service in an implementation mode according to the embodiments of the present disclosure. The apparatus may include a deployment component 201, a data collection configuration component 202, and a data collection component 203.

The deployment component 201 is configured to install, in a cloud host of a cloud platform in advance, a communication apparatus which interacts with a host machine without depending on a network, and deploy data collection agents in the host machine; and integrate data collection programs matched with the data collection agents, and matched with data collection templates of various types of application services in an application service installation package in advance.

The data collection configuration component 202 is configured to generate, when it is detected that a target application service is generated, a data collection configuration file according to attribute information of the target application service and a target data collection template matched with the type of the target application service.

The data collection component 203 is configured to acquire, when the target application service is deployed in the cloud host, monitoring performance data which is collected by the cloud host on the basis of the data collection configuration file.

In some embodiments of the present disclosure, the apparatus may further include an alert configuration component, configured to acquire a target alert template matched with the type of the target application service; automatically generate an alert instance for the target application service according to the target alert template; and set, in response to a threshold setting instruction, a corresponding alert threshold for each performance item of the alert instance.

As embodiments of the present disclosure, the alert configuration component may be configured to: determine whether a target alert task of the type to which the alert instance belongs exists; add, in response to that the target alert task of the type to which the alert instance belongs exists, the alert instance to the target alert task; and automatically create, in response to that the target alert task of the type to which the alert instance belongs does not exist, the target alert task of the type to which the alert instance belongs, and simultaneously add the alert instance to the target alarm task.

As embodiments of the present disclosure, the alert configuration component may further be configured to: automatically generate a corresponding periodic task for each type of the alert task according to a preset frequency; acquire, when it is detected that the target periodic task is generated, current performance data values of all application services to be alerted of the alert task corresponding to the target periodic task; acquire the alert threshold of each performance item from the alert instance of each application service to be alerted; and generate, for each application service to be alerted, alert information according to the current performance data value of the current application service to be alerted and the corresponding alert threshold.

As the other embodiment of the present disclosure, the alert configuration component may further be configured to automatically evenly allocate, based on an average number of the alert tasks and an average weight of the alert tasks, all the current alert tasks to multiple alert task instances for execution.

In some embodiments of the present disclosure, the apparatus, for example, may further include a query component, configured to configure a data query template for each type of the application service in advance, and set a query identity; acquire, in response to a data query instruction, a target data query template matched with the type of the target application service; and generate, according to the query identity of the target application service, data query information of the target application service on the basis of the target data query template.

The functions of each functional component of the apparatus for monitoring application service of the embodiments of the present disclosure may be realized according to the method in the above method embodiment, and the implementation process may refer to the relevant description of the above method embodiment, which will not be elaborated here.

It may be seen from the above that the embodiments of the present disclosure may securely and efficiently monitor various types of application services of the cloud platform.

Figure 3:
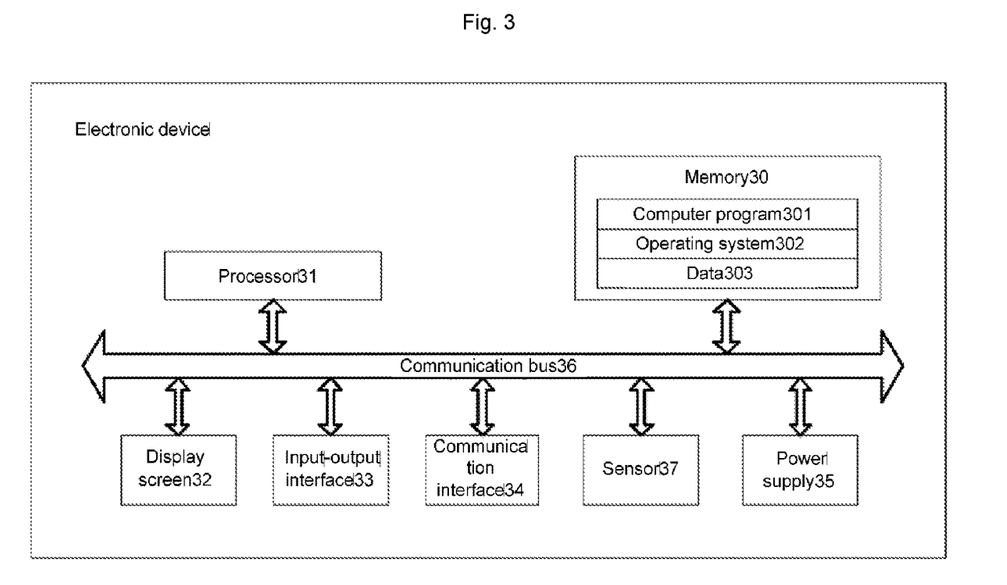
FIG. 3 is a structural diagram of an electronic device in an implementation mode according to the embodiments of the present disclosure.

The apparatus for monitoring application service mentioned above is described from the perspective of the functional component. Further, the embodiments of the present disclosure also provide an electronic device, which is described from the perspective of hardware. FIG. 3 is a structural diagram of an electronic device in an implementation mode according to the embodiments of the present disclosure. As shown in FIG. 3, the electronic device includes a memory configured to store a computer program; and a processor 31, configured to implement the steps of the method for monitoring application service mentioned in any of the above embodiments when executing the computer program.

The processor 31 may include one or more processing cores, such as a 4-core processor, an 8-core processor, and the processor 31 may also be a controller, microcontroller, microprocessor or other data processing chip, etc. The processor 31 may be implemented in at least one hardware form of Digital Signal Processing (DSP), a Field-Programmable Gate Array (FPGA), and Programmable Logic Array (PLA). The processor 31 may also include a main processor and a coprocessor. The main processor is a processor configured to process data in a wake state, also known as a Central Processing Unit (CPU), and the coprocessor is a low-power processor configured to process data in a standby state. In some embodiments of the present disclosure, the processor 31 may be integrated with a Graphics Processing Unit (GPU), and the GPU is responsible for rendering and drawing the content that a display screen needs to display. In some embodiments of the present disclosure, the processor 31 may also include an Artificial intelligence (AI) processor, and the AI processor is configured to process computational operations related to machine learning.

The memory 30 may include one or more non-transitory computer-readable storage medium, which may be non-transient. The memory 30 may include a high speed Random Access Memory (RAM) and a non-volatile memory such as one or more disk storage apparatuses and a flash memory. In some embodiments of the present disclosure, the memory 30 may be an internal storage unit of the electronic device, such as a hard disk of a server. In other embodiments of the present disclosure, the memory 30 may also be an external storage device of the electronic device, such as a plug-in hard disk, a Smart Media Card (SMC), a Secure Digital Card (SD), a Flash Card, etc., equipped on the server. Further, the memory 30 may include both the internal storage unit of the electronic device and the external storage device. The memory 30 may be configured not only to store application software and various data installed in the electronic device, such as a code of a program that performs a vulnerability handling method, but also to temporarily store data that has been or will be output. In some embodiments of the present disclosure, the memory 30 is configured to store at least the following computer program 301. The computer program, after being loaded and executed by processor 31, is capable of implementing the relevant steps of the method for monitoring application service disclosed in any of the foregoing embodiments. In addition, resources stored by the memory 30 may also include an operating system 302 and data 303, etc., and a storage method may be transient storage or permanent storage. The operating system 302 may include Windows, Unix, Linux, etc. The data 303 may include, but is not limited to, data corresponding to application service monitoring results, etc.

In some embodiments of the present disclosure, the electronic device may also include a display screen 32, an input-output interface 33, a communication interface 34 or a network interface, a power supply 35, and a communication bus 36. The display screen 32 and the input-output interface 33, such as a Keyboard, are user interfaces, and the user interfaces may also include standard wired interfaces, wireless interfaces, etc. In some embodiments of the present disclosure, the display may be a Light-Emitting Diode (LED) display, a liquid crystal display, a touch liquid crystal display, an Organic Light-Emitting Diode (OLED) touch device, etc. The display, which may also be appropriately referred to as a display screen or display unit, is configured to display information processed in the electronic device and a user interface for display visualization. In some embodiments of the present disclosure, the communication interface 34 may include wired interfaces and/or wireless interfaces, such as WI-FI interfaces, Bluetooth interfaces, etc., which are commonly configured to establish communication connections between the electronic device and other electronic devices. The communication bus 36 may be either a Peripheral Component Interconnect (PCI) bus or an Extended Industry Standard Architecture (EISA) bus, etc. The bus may be classified into an address bus, a data bus, a control bus, etc. For ease of representation, only a thick line is shown in FIG. 3, but this does not mean that there is only one bus or one type of bus.

It may be understood by those skilled in the art that the structure shown in FIG. 3 does not constitute a limitation to the electronic device, and may include more or fewer components than shown in the figure, including, for example, a sensor 37 for implementing various functions.

The functions of each functional component of the electronic device of the embodiments of the present disclosure may be realized according to the method in the above method embodiment, and the implementation process may refer to the relevant description of the above method embodiment, which will not be elaborated here.

It may be seen from the above that the embodiments of the present disclosure may securely and efficiently monitor various types of application services of the cloud platform.

It is understandable that, when being realized in form of software functional unit and sold or used as an independent product, the method for monitoring application service in the above embodiment may be stored in a non-transitory computer-readable storage medium. Based on this understanding, the technical solutions of the embodiments of the present disclosure essentially or the parts that contribute to the related art, or all or part of the technical solutions may be embodied in the form of a software product. The computer software product is stored in a storage medium to execute all or part of the steps of the method described in the various embodiments of the present disclosure. The foregoing storage medium includes: various media capable of storing program codes such as a U disk, a mobile hard disk, a Read-Only Memory (ROM), an RAM, an electrically erasable programmable ROM, a register, a hard disk, a multimedia card, a card type memory (such as an SD or DX memory, etc.), a magnetic memory, a removable disk, a CD-ROM, a magnetic disk, or an optical disk.

Based on this, the embodiments of the present disclosure also provide a non-transitory readable storage medium, on which a computer program is stored, and when executed by a processor, the computer program implements the steps of the method for monitoring application service in any one of the embodiments as described above.

The various embodiments in the present specification are described in a progressive manner, and each embodiment focuses on differences from other embodiments, and the same or similar parts between the various embodiments may be referred to each other. For the hardware including the apparatus and the electronic device disclosed in the embodiments of the present disclosure, since it corresponds to the method disclosed in the embodiments of the present disclosure, the description is relatively simple, and the relevant parts may be referred to the method part.

Professionals may realize that the units and algorithm steps of each example described in combination with the embodiments disclosed in the embodiments of the present disclosure may be implemented by electronic hardware, computer hardware or a combination of computer software and the electronic hardware. In order to clearly illustrate the interchangeability of hardware and software, the composition and steps of each example have been described in general terms of function in the above description. Whether these functions are executed in a hardware or software manner depends on specific applications and design constraints of the technical solutions. Professionals may realize the described functions for each specific application by use of different methods, but such realization shall fall within the scope of the embodiments of the present disclosure.

The method and apparatus for monitoring application service, the electronic device, and the non-transitory readable storage medium provided by the embodiments of the present disclosure are described in detail above. The principles and implementation modes of the embodiments of the present disclosure are described herein using examples, the foregoing description of the embodiments are only used to help the understanding of the method and core concept of the embodiments of the present disclosure. It is to be noted that a number of improvements and modifications may be also made to the embodiments of the present disclosure by those of ordinary skill in the art without departing from the principle of the embodiments of the present disclosure, and all fall within the scope of protection of the claims of the present disclosure.

The invention claimed is:

1. A method for monitoring application service, which is applied to a monitoring and management system of a host machine of a cloud platform, a network to which the monitoring and management system belongs is a management network, comprising:

installing, in a cloud host of the cloud platform in advance, a communication apparatus which interacts with the host machine without depending on a network, and deploying data collection agents in the host machine;

integrating data collection programs matched with the data collection agents, and matched with data collection templates of various types of application services in an application service installation package, wherein a network where each application service is located is an application network, the management network and the application network are disconnected;

when it is detected that a target application service is generated, generating a data collection configuration file according to attribute information of the target application service and a target data collection template matched with the type of the target application service; and when the target application service is successfully deployed in the cloud host, acquiring monitoring performance data which is collected by the cloud host on the basis of the data collection configuration file;

wherein after it is detected that the target application service is generated, the method further comprises: acquiring a target alert template matched with the type of the target application service; automatically generating an alert instance for the target application service according to the target alert template; and setting, in response to a threshold setting instruction, a corresponding alert threshold of each performance item of the alert instance.

2. The method for monitoring application service as claimed in claim 1, wherein after the alert instance is automatically generated for the target application service according to the target alert template, the method further comprises:

determining whether a target alert task of the type to which the alert instance belongs exists;

in response to that the target alert task of the type to which the alert instance belongs exists, adding the alert instance to the target alert task; and in response to that the target alert task of the type to which the alert instance belongs does not exist, automatically creating the target alert task of the type to which the alert instance belongs, and simultaneously adding the alert instance to the target alarm task.

3. The method for monitoring application service as claimed in claim 2, wherein after the alert instance is automatically generated for the target application service according to the target alert template, the method further comprises:

automatically generating a corresponding periodic task for each type of an alert task according to a preset frequency;

when it is detected that a target periodic task is generated, acquiring current performance data values of all application services to be alerted of the alert task corresponding to the target periodic task;

acquiring the alert threshold of each performance item from the alert instance of each application service to be alerted; and generating, for each application service to be alerted, alert information according to the current performance data value of the current application service to be alerted and the corresponding alert threshold.

4. The method for monitoring application service as claimed in claim 1, wherein after the data collection programs matched with the data collection agents, and the data collection templates of various types of application services are integrated in the application service installation package, the method further comprises:

automatically evenly allocating, based on an average number of the alert tasks and an average weight of the alert tasks, all the current alert tasks to multiple alert task instances for execution.

5. The method for monitoring application service as claimed in claim 1, wherein after the target application service is successfully deployed in the cloud host, the method further comprises:

configuring a data query template for each type of the application service in advance, and setting a query identity;

acquiring, in response to a data query instruction, a target data query template matched with the type of the target application service; and generating, according to the query identity of the target application service, data query information of the target application service on the basis of the target data query template.

6. The method for monitoring application service as claimed in claim 5, wherein the query identity is index information of the data query template.

7. The method for monitoring application service as claimed in claim 1, wherein the data collection programs matched with the data collection agents are installed inside the cloud host within a monitoring scope.

8. The method for monitoring application service as claimed in claim 1, wherein an application program is installed inside the cloud host, and the monitoring and management system of the host machine collect data through the application program.

9. The method for monitoring application service as claimed in claim 1, wherein the method further comprising:

calling, by the monitoring and management system, the data collection programs matched with the data collection agents inside the cloud host, and reporting output data to a time series database.

10. The method for monitoring application service as claimed in claim 1, wherein the method further comprising:

adopting a same data collection mode for a same type of the application services, and different data collection modes for different types of the application services.

11. The method for monitoring application service as claimed in claim 1, wherein the method further comprising:

using, by the monitoring and management system of the host machine of the cloud platform, the data collection agents to call the data collection programs matched with the data collection agents inside the cloud host through the communication apparatus to capture performance data during a running process of the data collection program as the monitoring performance data.

12. An electronic device, which is applied to a monitoring and management system of a host machine of a cloud platform, a network which the monitoring and management system belongs is a management network, the electronic device comprises a processor and a memory, wherein the processor is configured to perform a computer program stored in the memory to: install, in a cloud host of a cloud platform in advance, a communication apparatus which interacts with a host machine without depending on a network, and deploying data collection agents in the host machine; integrate data collection programs matched with the data collection agents, and matched with data collection templates of various types of application services in an application service installation package, wherein a network where each application service is located is an application network, the management network and the application network are disconnected; when it is detected that a target application service is generated, generate a data collection configuration file according to attribute information of the target application service and a target data collection template matched with the type of the target application service; and when the target application service is successfully deployed in the cloud host, acquire monitoring performance data which is collected by the cloud host on the basis of the data collection configuration file; wherein after it is detected the target application service is generated, the processor is configured to perform the computer program to: acquire a target alert template matched with the type of the target application service; automatically generate an alert instance for the target application service according to the target alert template; and set, in response to a threshold setting instruction, a corresponding alert threshold for each performance item of the alert instance.

13. The electronic device as claimed in claim 12, the processor is configured to perform the computer program to: determine whether a target alert task of the type to which the alert instance belongs exists; in response to that the target alert task of the type to which the alert instance belongs exists, add the alert instance to the target alert task; and in response to that the target alert task of the type to which the alert instance belongs does not exist, automatically create the target alert task of the type to which the alert instance belongs, and simultaneously add the alert instance to the target alarm task.

14. The electronic device as claimed in claim 13, the processor is configured to perform the computer program to: automatically generate a corresponding periodic task for each type of an alert task according to a preset frequency; when it is detected that a target periodic task is generated, acquire current performance data values of all application services to be alerted of the alert task corresponding to the target periodic task; acquire the alert threshold of each performance item from the alert instance of each application service to be alerted; and generate, for each application service to be alerted, alert information according to the current performance data value of the current application service to be alerted and the correspond alert threshold.

15. The electronic device as claimed in claim 12, the processor is configured to perform the computer program to: automatically evenly allocate, based on an average number of the alert tasks and an average weight of the alert tasks, all the current alert tasks to multiple alert task instances for execution.

16. The electronic device as claimed in claim 12, the processor is configured to perform the computer program to: configure a data query template for each type of the application service in advance, and set a query identity; acquire, in response to a data query instruction, a target data query template matched with the type of the target application service; and generate, according to the query identity of the target application service, data query information of the target application service on the basis of the target data query template.

17. A non-transitory readable storage medium, which is applied to a monitoring and management system of a host machine of a cloud platform, a network to which the monitoring and management system belongs is a management network, the non-transitory readable storage medium stores a computer program that is performed by a processor, and upon performed by the processor, the computer program causes the processor to: install, in a cloud host of a cloud platform in advance, a communication apparatus which interacts with a host machine without depending on a network, and deploying data collection agents in the host machine; integrate data collection programs matched with the data collection agents, and matched with data collection templates of various types of application services in an application service installation package, wherein a network where each application service is located is an application network, the management network and the application network are disconnected; when it is detected that a target application service is generated, generate a data collection configuration file according to attribute information of the target application service and a target data collection template matched with the type of the target application service; and when the target application service is successfully deployed in the cloud host, acquire monitoring performance data which is collected by the cloud host on the basis of the data collection configuration file; wherein after it is detected that the target application service is generated, the processor is configured to perform the computer program to: acquire a target alert template matched with the type of the target application service; automatically generate an alert instance for the target application service according to the target alert template; and set, in response to a threshold setting instruction, a corresponding alert threshold for each performance item of the alert instance.

* * * * *